Dec. 1, 1959 W. A. HOIER 2,914,890
WORK HANDLING AND INDEXING MECHANISM
Filed March 6, 1958 7 Sheets-Sheet 1

INVENTOR.
WALTER A. HOIER
BY
ATTORNEYS.

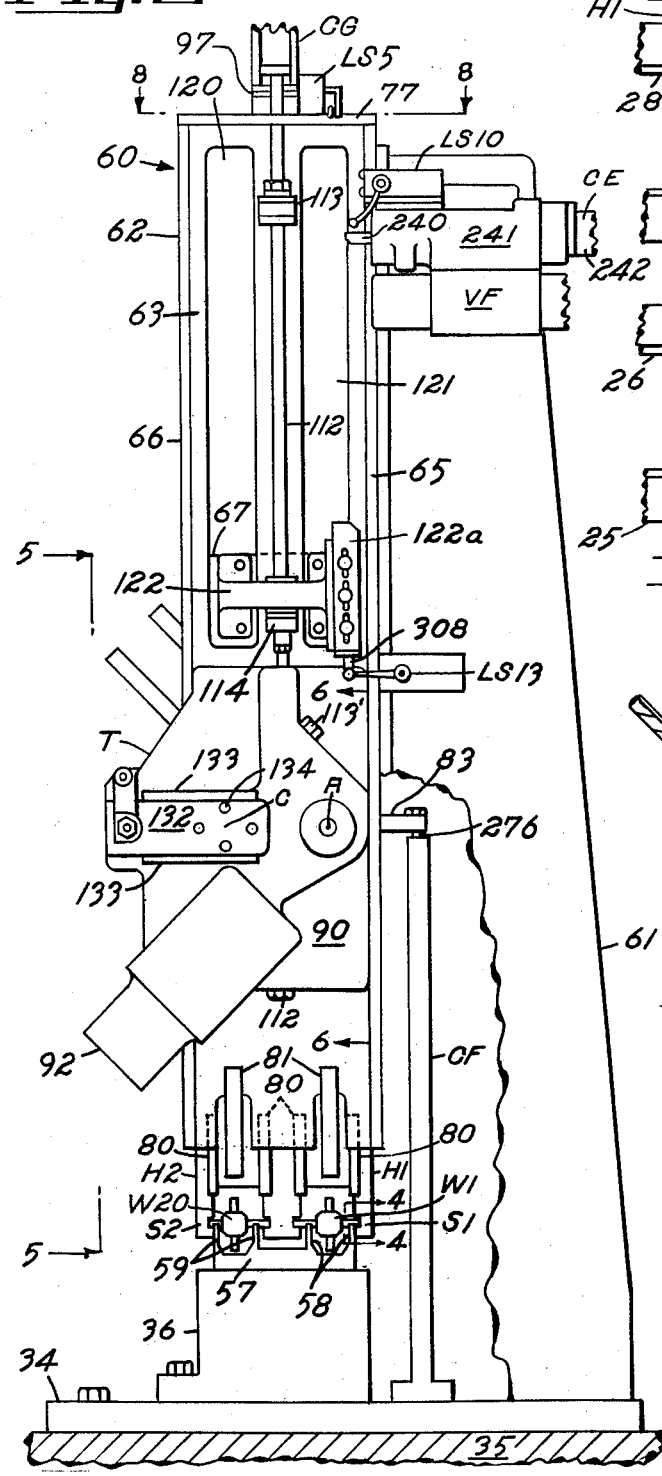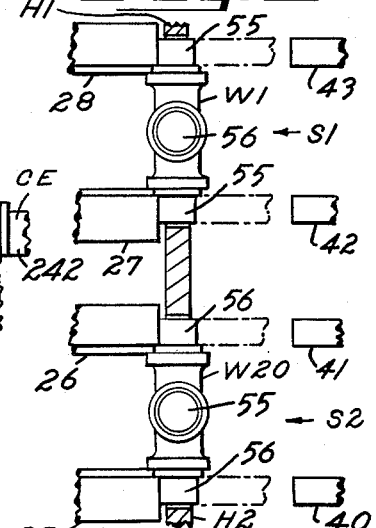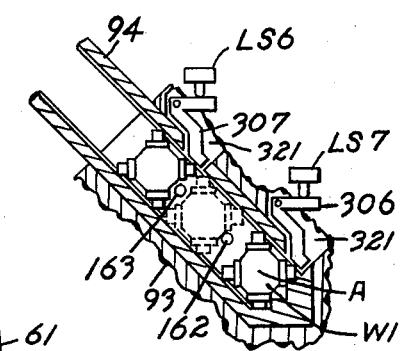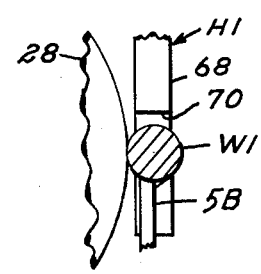
Dec. 1, 1959 — W. A. HOIER — 2,914,890
WORK HANDLING AND INDEXING MECHANISM
Filed March 6, 1958 — 7 Sheets-Sheet 2
INVENTOR.
WALTER A. HOIER
BY
ATTORNEYS.

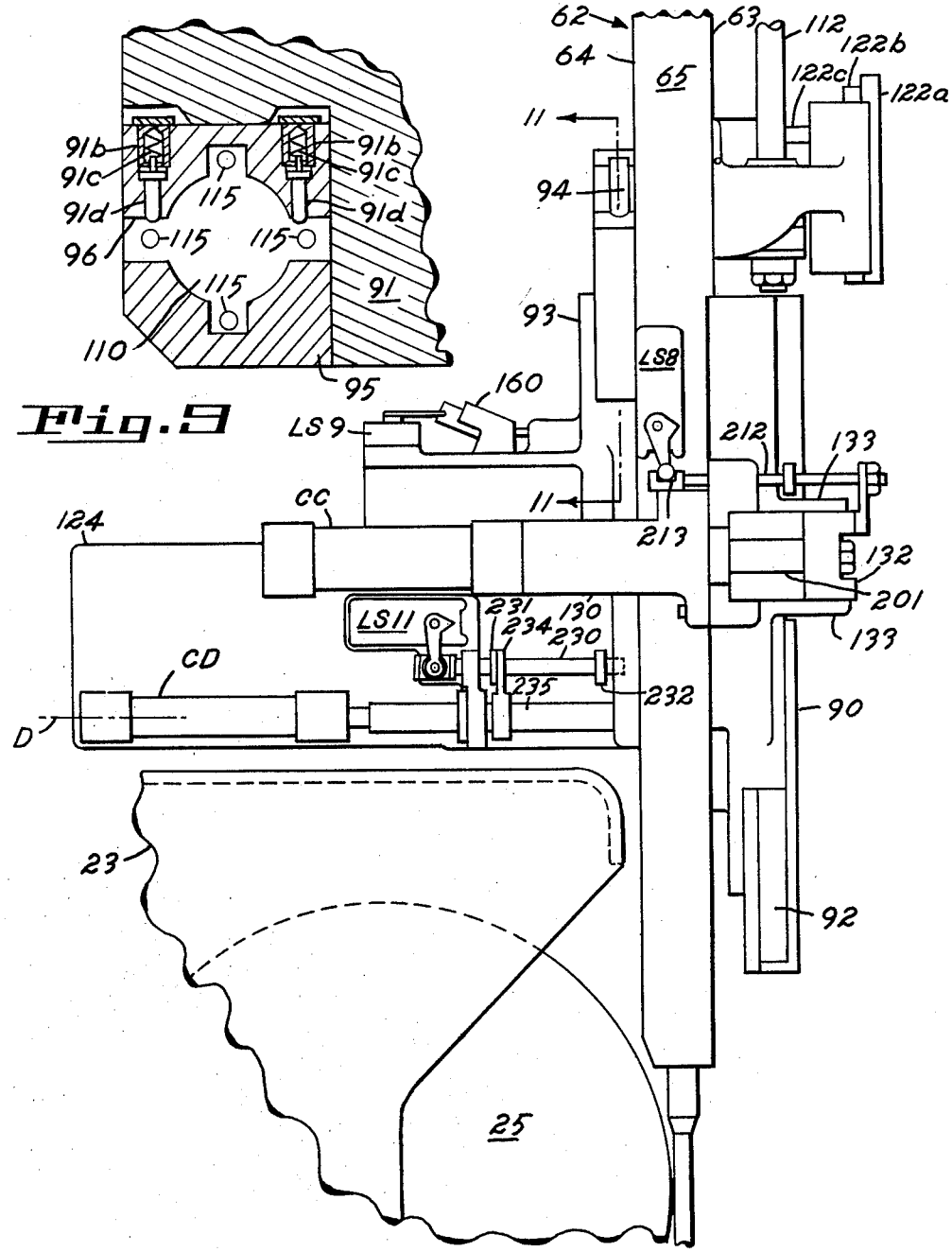

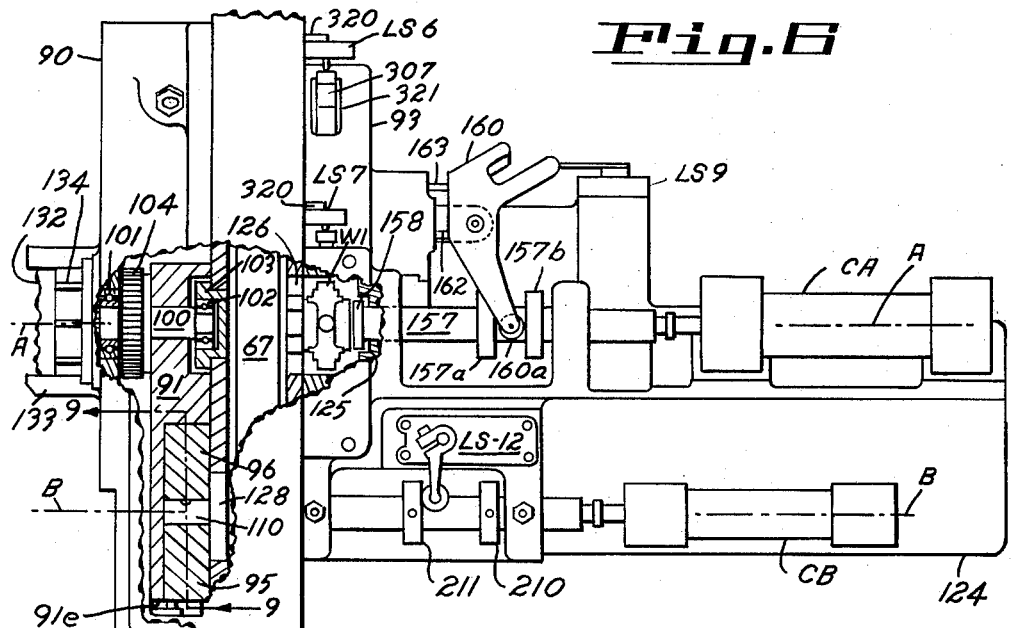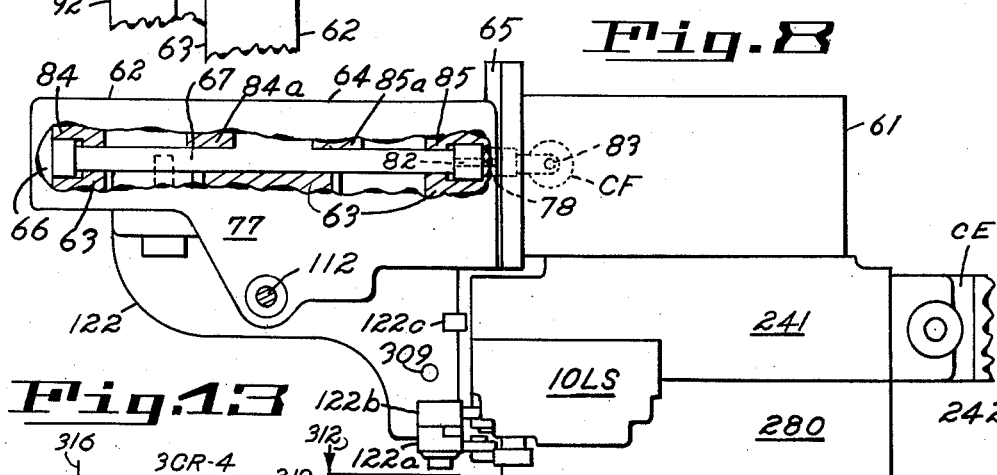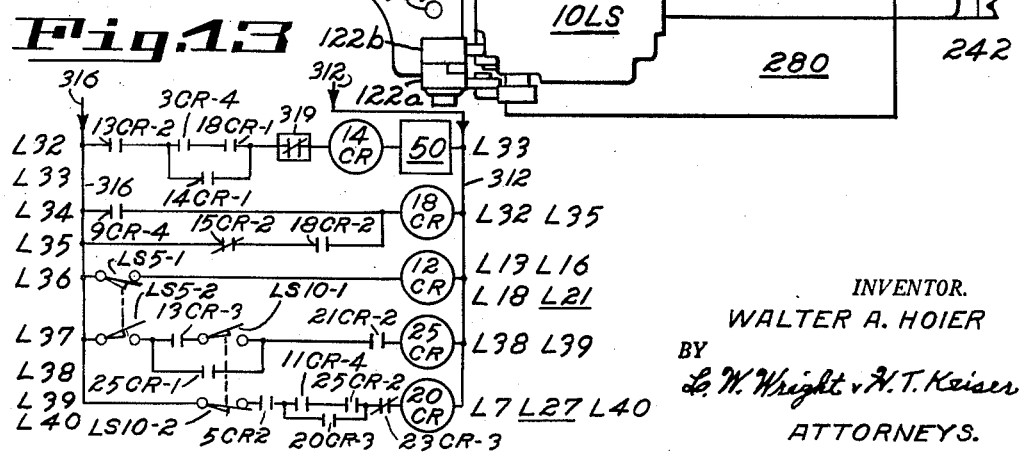

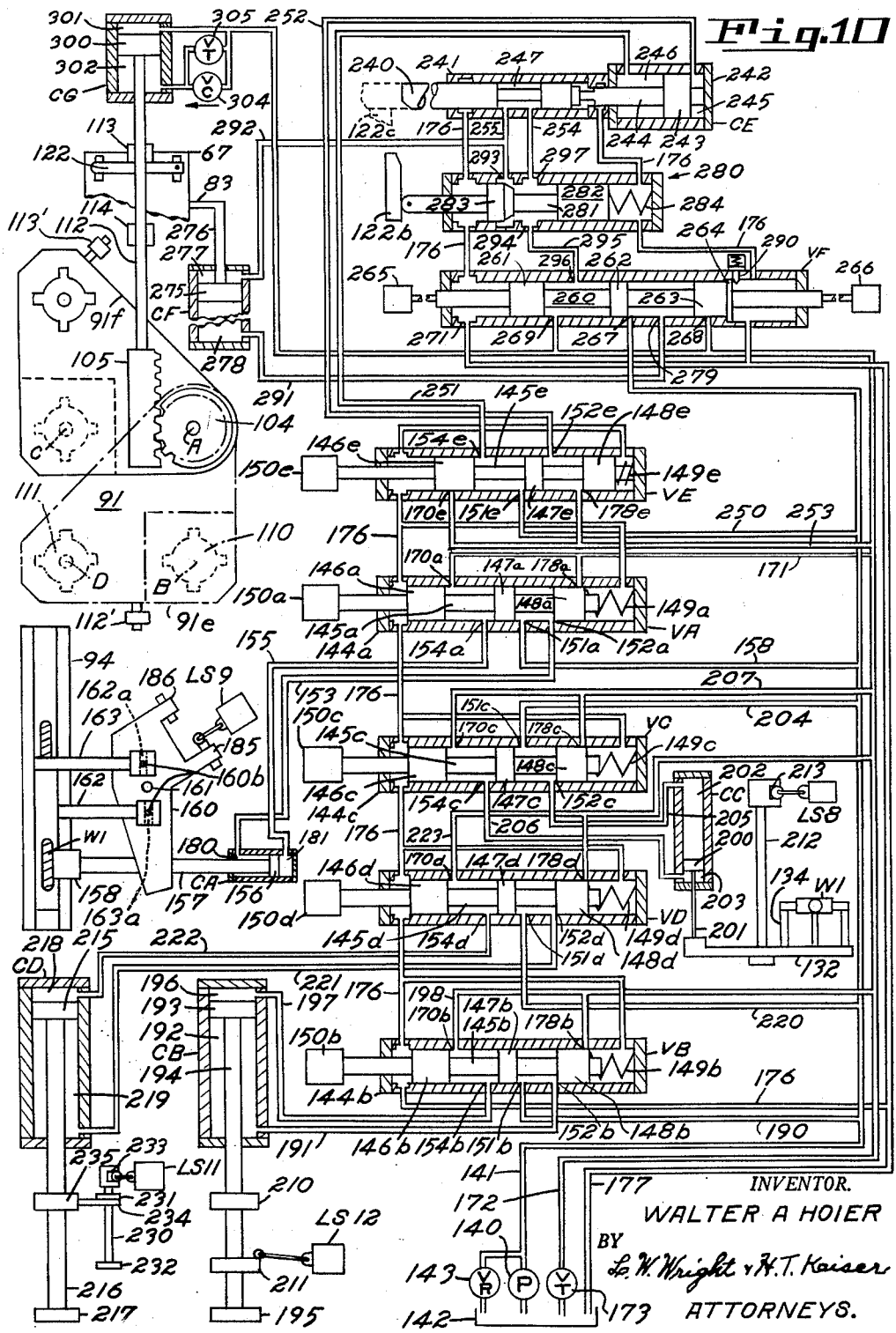

United States Patent Office 2,914,890
Patented Dec. 1, 1959

2,914,890

WORK HANDLING AND INDEXING MECHANISM

Walter A. Hoier, Cincinnati, Ohio, assignor to The Cincinnati Milling Machine Co., Cincinnati, Ohio, a corporation of Ohio Application March 6, 1958, Serial No. 719,580

10 Claims. (Cl. 51—215)

The present invention relates to a work handling and indexing mechanism for machine tools particularly suitable for use with a two station centerless grinding machine where each part must be successively ground at the stations.

There are many types of parts which require a machine operation on two different surfaces and, where possible, it is desirable to machine these surfaces simultaneously to avoid duplicate handling and machine set-up. When the part is to be ground on a centerless grinding machine, where the part is rotated about an axis of rotation and brought into contact with a grinding wheel rotating at a different speed of rotation, and the surfaces to be ground lie parallel to two different axes of rotation, it is not possible to grind them simultaneously.

The work handling and indexing mechanism of the present invention is particularly suitable for these applications. It operates to take a work piece from a loading chute and deposit it at a first work station in proper orientation for rotation about one axis. The work piece is then moved from the first work station to a second station, the piece being rotated, or indexed, during this movement so that it is oriented for rotation about a second axis at the second work station. Thereafter the part is removed from the second work station and ejected from the machine tool.

The mechanism is operable to handle two pieces simultaneously. While one piece is having its first surface ground at the first work station, a second piece, which previously had its first surface ground at the first work station, is having its second surface ground at the second work station.

In brief, in the preferred embodiment of the present invention, a carriage has two work piece holders and moves between a position where one of the work piece holders receives a work piece and a second position where the work piece holders are aligned, respectively, with the two work stations of the machine, and the work piece received on the one holder is oriented for grinding of one of its surfaces at one of said work stations. After grinding, the carriage is moved to an intermediate position where the work piece holder carrying the piece with its one surface ground is aligned with the pocket of a member rotatable, or swingable, about an axis. The partially ground work piece is transferred to that member and the latter is swung through an angle equal to the angle between the two surfaces to be ground on the work piece. The work piece is then transferred to the other work piece holder and the carriage moved to carry that piece to the second work station, where it is properly oriented for the grinding operation on its other surface.

It is, therefore, a general object of the present invention to provide a mechanism to move a work piece between the work stations in a machine tool and simultaneously index the work piece.

It is another object to provide a mechanism to handle two work pieces simultaneously and move each piece between a first work station and a second work station while indexing the same.

It is still another object of the present invention to provide a work handling mechanism for a centerless grinder having two work stations operable to move a work piece for grinding at one station about a first axis of rotation and thereafter move the work piece to the second work station for grinding about a second axis of rotation.

It is a further object of the present invention to provide a mechanism operable to move a work piece between work stations and simultaneously index the same which is positive acting and effective in its operations, and which is of simple construction and easy to operate.

Other objects and advantages of the present invention should be readily apparent by reference to the following specification, considered in conjunction with the accompanying drawings forming a part thereof, and it is to be understood that any modifications may be made in the exact structural details there shown and described, without, in the scope of the appended claims, without departing from or exceeding the spirit of the invention.

In the drawings:

Fig. 2 is a view through section 2—2 of Fig. 1 showing the front of the work handling and indexing mechanism;

Fig. 3 is a view through section 3—3 of Fig. 1;

Fig. 4 is a view through section 4—4 of Fig. 2;

Fig. 5 is a view through section 5—5 of Fig. 2;

Fig. 6 is a view through section 6—6 of Fig. 2;

Fig. 8 is a view through section 8—8 of Fig. 2;

Fig. 9 is a view through section 9—9 of Fig. 6;

Fig. 10 is a schematic diagram of the hydraulic circuit of the work handling and indexing mechanism;

Fig. 11 is a view through section 11—11 of Fig. 5;

Figs. 12 and 13 are schematic wiring diagrams of the work handling mechanism of the present invention;

Figures 14A, 14B, 14C, 15:
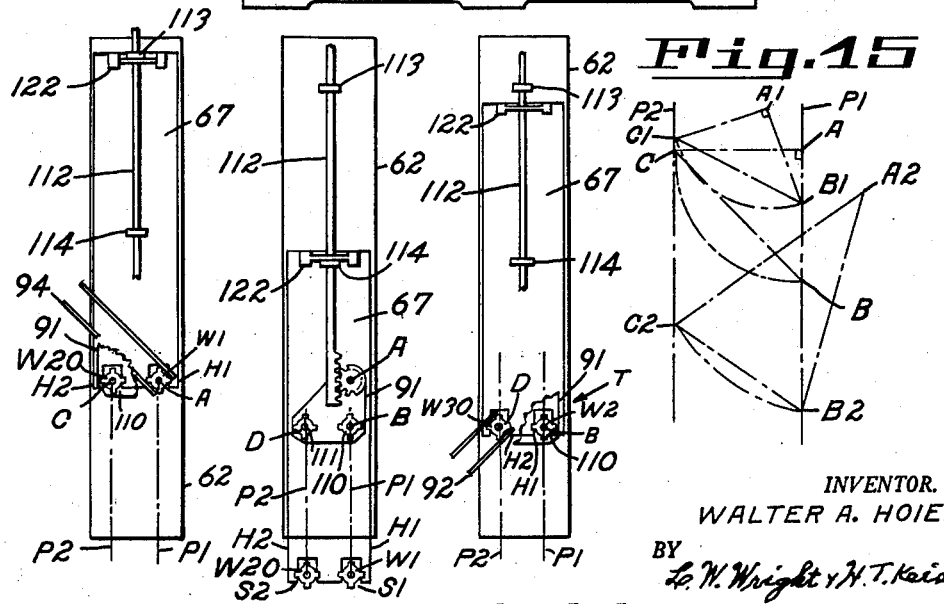

Figs. 14a, 14b and 14c are schematic views of the work handling mechanism showing the relative position of the parts thereof when the carriage and rotatable transfer member are in the upper, or loading, position, when the carriage and rotatable transfer member are in the lower, or operating, position, and when the carriage is in the intermediate position at the transfer station and the rotatable member is in the lower position, respectively;

Fig. 15 is a sketch showing the relation of the axis of the rotatable member, the pocket of the rotatable member, and the paths of the work piece holders.

Figure 1:
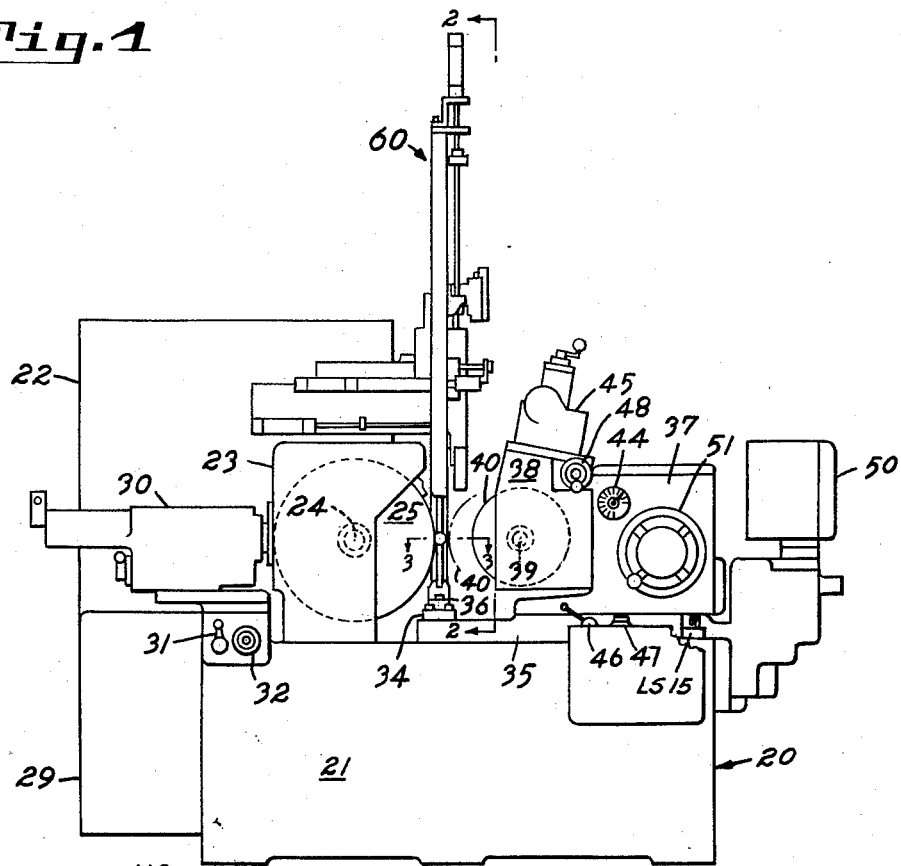
Fig. 1 is a front elevational view of a centerless grinder with the work handling mechanism of the present invention installed.

A centerless grinding machine with the work handling and indexing mechanism of the present invention installed thereon is shown generally at 20 in Fig. 1. The machine has a base 21, an upstanding control cabinet 22, and a wheelhead 23 which supports a spindle 24 carrying four grinding wheels 25, 26, 27, and 28 (see Fig. 3). The grinding wheels are driven by a motor, not shown, in the motor cabinet 29. The machine has a grinding wheel truing device 30, the cross movement of which is controlled by engaging lever 31 and rate adjustment control 32. A lower slide 35 is mounted on the base 21 and at its inboard end supports a base plate 34, which in turn carries an upstanding blade holder 36, and the work handling mechanism 60. An upper slide 37 is mounted on the lower slide 35 outboard of the blade holder 36 and supports a regulating wheel housing 38. The housing 38 supports a spindle 39 which carries four spaced regulating wheels 40, 41, 42, and 43 (see Fig. 3), which are aligned with the grinding wheels. A tachometer dial 44 indicates the angular velocity of the regulating wheels. The movement of the truing device 45 for the regulating wheels is controlled by an engaging lever 46, a rate adjustment control 47, and a manual cross feed wheel 48. Movement of the lower slide 35 in relation to the base 21 and movement of the upper slide in relation to the slide 35 is provided by the unit 50, which operates automatically to move the regulating wheels into the grinding position shown by the dotted line in Fig. 1. Manual movement of the lower slide 35 and upper slide 37 is accomplished by wheel 51.

The work pieces, which may, for example, be cross-shaped joints with two pairs 55 and 56 of opposed trunnions, the pairs lying on perpendicular axes, are designated generally as W. One work piece is designated W1 when unground, W2 when one pair 55 of trunnions are ground, and W3 when both pair 55 and 56 of trunnions are ground, and a second work piece is designated W20 when one pair 55 of trunnions is ground and W30 when both pair 55 and 56 of trunnions are ground. As shown in Fig. 3, the grinding wheels 27 and 28 and their corresponding regulating wheels 42 and 43 define a work station S1, and the grinding wheels 25 and 26 and their corresponding regulating wheels 40 and 41 define a second work station S2. As shown in Fig. 2, a blade 57 is received in the blade holder 36 and has two pairs 58 and 59 of upstanding arms. The arms 58 support an unground piece W1 at station S1 for the simultaneous grinding of the opposed trunnions 55 by the grinding wheels 27 and 28. The arms 59 support a work piece W20, which has already had its trunnions 55 ground at work station S1, with the trunnions 56 oriented for grinding by the grinding wheels 25 and 26 at station S2. Rotation is imparted by the regulating wheels to the work pieces W1 and W20 to give them a relative rotation in respect to the grinding wheels for cutting action as in conventitonal centerless grinding.

The work handling mechanism shown generally at 60 is mounted on the base 34 and is positioned above the work stations as shown in Fig. 1. As shown in Fig. 2, a housing 61 seats on the base 34 and has one side connected to the side of a casing 62. The casing 62 has a plate 63 which, when viewed as in Fig. 2, may be designated a front plate, a rear plate 64 (see Fig. 5), side plates 66 and 65, the latter being connected to the housing 61, and a top plate 77 which overhangs the front plate 63 (see Fig. 8). A carriage 67 is slidably received in the casing 62 and has depending therefrom two work piece holders H1 and H2. As shown best in Fig. 7, the work piece holders consist of two outboard depending fingers 68 and 69 having, respectively, notches 70 and 71, and a central depending member 72 having opposed notches 73 and 74 to define inboard fingers 75 and 76. As shown best in Fig. 4, each notch has a shallow V-shaped base to cradle the trunnion of a work piece received thereon. Thus, fingers 69 and 75 define the work piece holder H2, while fingers 76 and 68 define the work piece holder H1. As shown in Fig. 2, guides 80 depend in opposed pairs from the front and rear plate 63 and 64 of the casing 62 in registration with the fingers of the work holders to retain the trunnions of work pieces thereon as the carriage 67 ascends. The guides 81 are connected to the front plate 63 and depend therefrom in registration with the trunnions not supported by the fingers to check rotation of the work piece and guide it into the casing in proper orientation when the carriage is elevated to carry the work pieces away from the work stations.

As shown best in Figs. 2 and 8, the carriage 67 is raised and lowered within the casing 62 by a hydraulic cylinder CF, contained in the housing 61. The carriage is connected to the piston rod 276 of the cylinder CF by a bolt 82 extending from a link 83 which passes through a slot 78 in the side plate 65 of the casing 62. As shown in Fig. 8, vertical strips 84 and 85 connected to the inside face of the rear plate 64 at each end thereof and two vertical strips 84a and 85a straddling the center of the rear plate and receiving a protruding portion of the carriage therebetween, together with the inner surface of the front plate 63, define ways in which the carriage 67 slides in vertical movement.

Figure 7:
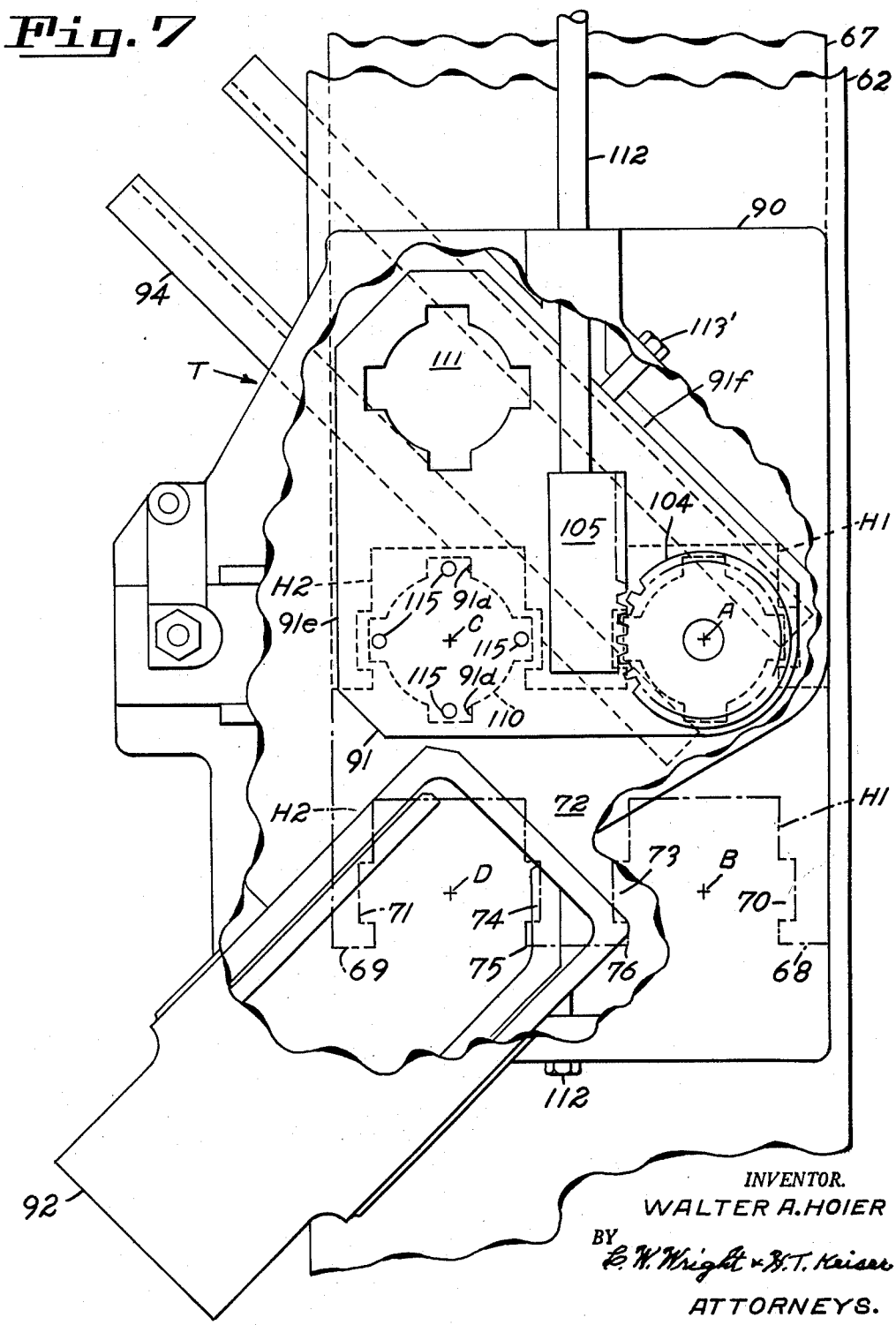
Fig. 7 is a front view of the transfer station of the work handling and indexing mechanism with portions broken away and showing the rotatable transfer member in its upper position and the work holders of the carriage in the upper positon in dotted lines and in the intermediate position in phantom lines.

As shown best in Figs. 5, 6, and 7, the carriage casing 62, at a transfer station T, has a front casing 90 connected to the front plate 63 which houses a rotatable transfer member, or plate, 91 and the operating mechanism therefor, and outboard thereof an ejection chute 92. Opposite the front casing 90 and connected to the rear plate 64 of the carriage casing 62 is a rear casing 93 carrying the loading chute 94.

The rotatable member 91 is carried within the front casing 90 on shaft 100 which lies on an axis A and at the forward end thereof is received in the anti-friction bearing 101 mounted in the front face of casing 90 as shown in Fig. 6. The rear of the shaft 100 is received in anti-friction bearing 102 which is carried in a fitting 103 snugly received in an opening in the front plate 63 of carriage casing 62, the casings 90 and 62 thereby providing a fixed support for the shaft. Between the member 91 and the forward bearing 101 the shaft 100 carries pinion 104 which, when rotated, swings the member 91. As shown best in Figs. 6, 7, and 9, the rotatable member 91 is a triangular shaped plate and is rotated about axis A. A rectangular recess is cut in one corner of the member 91, and blocks 95 and 96 are received therein. The blocks 95 and 96 are shaped so that when connected to the plate 91 adjacent each other the space therebetween defines a pocket 110 shaped to correspond to the shape of the work piece to receive the same. The pocket 110 is spaced from the axis A. The block 96 has sleeves 91b threadedly received therein which receive springs 91c engaged with detent plungers 91d. The plungers 91d protrude from the wall of pocket 110 in the portion where the trunnions are received, and serve to hold a work piece in the pocket. Four holes 115 in the member 91 are positioned in registration with the trunnion receiving portions of the pocket 110. The member 91 has an opening 111 extending therethrough which is also shaped to correspond with the shape of the work piece. The triangular shaped rotary member 91 swings about the axis A between a lower position (see Fig. 10) where one side 91e engages the stop screw 112', and an elevated position where another side 91f engages the stop screw 113'. The stop screw 112' is threadedly received in the bottom of front casing 90 (see Fig. 2) and the stop screw 113' is threadedly received in the upper portion thereof. When the member 91 is in the lower position, the center of pocket 110 falls on axis B (see Fig. 10), and the center of opening 111 falls on axis D. When the member 91 is in the elevated position the center of pocket 110 falls on axis C as shown in Figs. 7 and 10. The movement of the member 91 between the lower position and the elevated position is achieved by the vertical movement of rack 105 which is carried at one end of rod 112 and engages pinion 104. As shown best in Figs. 2 and 10, the rod 112 passes through the top of the front casing 90 and through the overhanging portion of the top 77 of carriage casing 62 and connects to the piston 300 of dashpot cylinder CG, which is mounted on a bracket 97 on top of carriage top 77. The rod 112 has two spaced collars 113 and 114 affixed thereto between the top 77 of carriage casing 62 and the top of the front casing 90.

As shown in Fig. 2, the front plate 63 of the carriage casing 62 has two vertical elongated openings 120 and 121. A carriage bracket 122 straddles the central portion of plate 63 between the openings and is connected through the openings to the slideable carriage 67 within the casing. The bracket 122 has connected thereto cams 122a and 122b, and a stop block 122c as shown best in Fig. 8. The bracket 122 slideably receives the rod 112 outside the casing 62 as shown in Fig. 2. The bracket 122 moves with the carriage 67 when it is raised and lowered by the cylinder CF. As the carriage approaches the elevated position, the bracket 122 engages the collar 113 to move the rod 112 and the rack 105 upwardly and thereby rotate the rotatable member 91 and swing it into its elevated position. As the carriage 67 approaches its lower position the bracket 122 engages the collar 114 and lowers the rack 105 to rotate the member 91 to its lower position, if that member has not dropped to the lower position through the force of gravity.

As shown best in Figs. 5 and 6, a bracket 124 is connected to the rear of the rear casing 93 and supports cylinders which operate to shift a work piece during the operating cycle. As shown in Fig. 6, the cylinder CA is supported to lie on axis A and operates plunger 158 to push an unground work piece W1 from the loading chute 94, which is located in the rear casing 93, to the fingers defining work piece holder H1 when the carriage is in its upper position. The rear plate 64 of the carriage casing 62 has an opening 126 through which the work piece W1 passes. The rear surface of the rear casing 93 also has an opening 125 to receive the plunger of the cylinder CA. Cylinder CB is secured to bracket 124 to lie on axis B and operates a plunger 195 (see Fig. 10) to push a partially ground work piece W2 from the fingers of work holder H1 to the pocket 110 of rotary member 91 when that member is in its lower position. The front plate 63 of carriage casing 62 has an opening 128 to permit passage of the piece therethrough, and the rear face of the carriage casing 62 has an opening (not shown) to receive the plunger of cylinder CB. As shown in Fig. 5, the cylinder CC is connected to a rearwardly extending sleeve 130, which is connected to the rear of a portion of the front casing 90 which extends beyond the carriage casing 62. The piston rod 201 of cylinder CC, which extends through the sleeve 130, has an arm 132 connected to its outer end which slides forwardly and rearwardly in guideways 133 on the front face of the front casing 90. The arm 132 extends inwardly, as shown in Fig. 2, and has four rearwardly projecting pins 134 at its inboard end which are spaced about axis C and project through openings (not shown) in the front of casing 90 and openings 115 in rotary member 91, and define a plunger operable to push a partially finished work piece from the pocket 110 to the work piece holder H2 when the rotary member 91 and the carriage 67 are in their upper positions (see Fig. 7). The front plate 63 of the carriage casings 62 has an opening (not shown) lying on axis C to permit the passage of the work piece therethrough. The cylinder CD, as shown in Fig. 5, is connected to bracket 124 and lies on axis D. The cylinder CD has a plunger 217 which operates to push a finished work piece from the work piece holder H2 through the opening 111 in member 91 into the ejection chute 92 when the rotary member 91 is in its lower position (see Fig. 7). An opening in the front plate 63 of carriage casing 62 lying on axis D (not shown) permits passage of the piece therethrough.

The hydraulic diagram for the work handling mechanism of the present invention is shown in Fig. 10. Fluid from a reservoir 142 is supplied under pressure to pressure line 141 through the pump 140. A relief valve 143 is connected to the pressure line 141 and discharges into the reservoir 142. The valve VA has a casing 144a in which is received movable member 145a carrying spools 146a, 147a, and 148a. The valve member 145a is normally held in the position shown by the spring 149a interposed between spool 148a and one end of casing 144a. The opposite end of the valve member 145a is received in the solenoid 150a which operates when energized to move the valve member to the right of the position shown. The pressure line 141 is connected to a port 151a through conduit 158. A port 152a is connected by line 153 to chamber 180 in one end of cylinder CA. Ports 151a and 152a are located between the spools 147a and 148a when the valve is in the position shown. A port 154a, located between spools 146a and 147a when the solenoid is deenergized, is connected to chamber 181 in the opposite end of cylinder CA through the line 155. Valve VA also has ports 170a and 178a which are connected by conduit 171 to exhaust conduit 172 which leads through throttle valve 173 to the reservoir 174. The throttle valve 173 maintains a slight back pressure on the exhaust conduit 172. Port 170a is positioned between spool 146a and 147a and port 178a is positioned in registration with spool 148 when the valve is in the position shown.

The valve VA operates cylinder CA having a piston 156 dividing the cylinder into the two chambers 180 and 181. Piston 156 is connected to rod 157 having a disc 158 at one end to define a plunger which operates to push a piece out of loading chute 94 onto work piece holder H1.

When the solenoid 150a is deenergized, and the valve member is in the position shown, pressure is supplied through line 141, 158, valve VA, line 153 to chamber 180 of cylinder CA. Fluid from chamber 181 is discharged through conduit 155, valve VA, and conduit 171 to discharge line 172. When solenoid 150a is energized, and the valve is shifted to the right of the position shown, ports 151a and 154a are connected through the valve, and pressure is supplied to chamber 181 of cylinder CA. Fluid from chamber 180 is discharged through conduit 153, valve VA from port 152a to 178a and conduit 171 to discharge line 172.

An escapement mechanism 160 is operatively connected to rod 157 for release of work pieces one at a time to the bottom position of the loading chute 94. The mechanism consists of an arm 160 pivoted about pin 161 and engaged at one end with rod 157 by means of a roller 160a on the end of the arm which is received between spaced collars 157a and 157b on rod 157 (see Fig. 6). Two rods 162 and 163 are slideably received in the loading chute 94 and have, at one end, slots 162a and 163a, respectively, extending perpendicular to their longitudinal axes which engage pins 160b on arm 160 located in straddling relationship to pivot pin 161 of arm 160. When the cylinder CA is operated to push a work piece from the bottom position, the lower rod 162 is moved into the loading chute, and the upper rod 163 is retracted. This permits a work piece to drop into the intermediate position, shown in dotted lines in Fig. 11, and the next piece to drop into the position immediately thereabove. When the cylinder is again operated to retract the rod 157, the upper rod 163 extends into the housing between the piece in the intermediate position and the piece immediately above while the lower rod 162 retracts to permit the piece in the intermediate position to drop to the lower position where its center lies on axis A, for loading upon the holder H1 upon the next operation of cylinder CA. The arm 160 has two spaced fingers 185 and 186 which operate the limit switch LS9. The switch LS9 has no spring return and positive mechanical actuation is required to change the switch from one condition to the other.

Valves VB, VC, VD, and VE are similar to valve VA, and parts of the valves are identified by numbers corresponding to the numbers given the similar parts on valve VA but with appropriate suffix letters. All valves are shown in the position with their solenoids deenergized except valve VE which is shown in the position assumed when the solenoid 150e is energized.

Valve VB operates cylinder CB is transfer a piece from the work piece holder H1 to the pocket 110 of rotary member 91. Cylinder CB has a piston 193 connected to piston rod 194 which has a disc 195 at its end to define plunger. When the solenoid 150b is deenergized, pressure is supplied from conduit 141 through conduit 190, which is connected to port 151b, through that port to port 152b, and through the conduit 191 connected to the latter port into the chamber 192 at one end of cylinder CB. This holds the piston 193 with the plunger thereof in the retracted position. Fluid from chamber 196 of cylinder CB, on the opposite side of the piston from chamber 192, discharges through conduit 197, port 154b, port 170b, and conduit 198 which is connected to the discharge line 172. When the solenoid 150b is energized, and the valve member 145b shifted to the right, pressure from line 141 and 190 is supplied to the port 151b which connects to port 154b and is passed to the chamber 196 through line 197. As the plunger is advanced, fluid from chamber 192 is discharged through conduit 191, port 152b, port 178b, and conduit 198 to discharge line 172. Two spaced collars 210 and 211 on rod 194 actuate limit switch LS12 which is similar in construction to limit switch LS9.

The valve VC operates cylinder CC to actuate the pins 134 and push a work piece from the pocket 110 of member 91 to the work piece holder H2. The cylinder CC has a piston 200 connected to rod 201 which in turn is connected to arm 132. The piston divides the cylinder into two chambers 202 and 203. When the solenoid 150c is deenergized, pressure is supplied to the chamber 202 from conduit 141 through conduit 204, port 151c, which connects through the valve to port 152c, and through conduit 205 to the chamber 202. Fluid is discharged from chamber 203 through conduit 206, port 154c, port 170c, and conduit 207 to the discharge line 172. When the solenoid 150c is energized, and the valve moves to the right, pressure from conduit 141 is supplied through conduit 204 to conduit 206 and thus chamber 203. Fluid is discharged from chamber 202 through conduit 205, port 152c, port 178c, and conduit 207 to the discharge line 172. A rod 212 is connected to the arm 132 and has a slot 213 which receives the arm of limit switch LS8, which is constructed similar to the limit switch LS9.

Valves VD operates cylinder CD to transfer a piece from the work piece holder H2 to the ejection chute 92. The cyinder CD has a piston 215 connected to a piston rod 216 which carries at its end a disc 217 to define a plunger. The cylinder is divided by the piston into two chambers 218 and 219. When solenoid 150d is deenergized and the valve is in the position shown, pressure is supplied from line 141 through conduit 220 to port 151d, port 152d, and through conduit 221 to the chamber 219 to hold the plunger retracted. The fluid from chamber 218 is discharged through conduit 222, port 154d, port 170d, and conduit 223 to discharge line 172. When the solenoid 150d is energized, and the valve is shifted to the right, pressure from conduits 141 and 220 is supplied through port 151d to port 154d and conduit 222 to the chamber 218. Fluid from chamber 219 is discharged through conduit 221, port 152d, port 178d, and conduit 223 to discharge line 172. A rod 230 having spaced collars 231 and 232 is slideably mounted on bracket 124 and casing 93 (see Fig. 5) and has a slot 233 which engages the arm of limit switch LS11 which is constructed similar to the limit switch LS9. The rod 230 is moved to actuate the limit switch LS11 by yoke 234 connected to collar 235 on piston rod 216.

Valve VE operates cylinder CE which is connected to the side of housing 61 (see Fig. 2) to extend the stop 240 into the path of carriage bracket 122 and engage the stop block 122c thereon to stop the carriage at an intermediate position between its top position and the bottom position with the holders H1 and H2 lying on axes B and D respectively as shown in phantom lines in Fig. 7. Cylinder CE consists of two compartments 241 and 242. Compartment 242 has a slideable piston 243 therein connected to a piston rod 244 which extends into compartment 241. The piston 243 divides the compartment 242 into chambers 245 and 246. Within the compartment 241 the piston rod 244 is connected to a stop 240 which extends out the other end of compartment 241. The stop 240 has a reduced portion within the compartment 241 to define a movable annular passage 247 therein. When the solenoid 150e of valve VE is energized, and the valve member 145e is in the position shown, pressure from conduit 141 is supplied through conduits 250, port 151e, port 154e, and conduit 251 to chamber 246 and the stop is held in the retracted position. Fluid from chamber 245 is discharged through conduit 252, port 152e, port 178e, to conduit 253 and discharge line 172. When the stop 240 is in the retracted position the conduit 255 and 254 are connected within the compartment 241 by the annular passage 247. When solenoid 150e is deenergized and the valve is shifted to the left by the spring 149e pressure from conduit 141 and conduit 250 is supplied to port 151e, port 152e, and conduit 252 to chamber 245. Fluid from chamber 246 is discharged through conduit 251, port 154e, port 170e, and conduit 253 to discharge line 172. With valve VE in this position, the stop 240 is extended, and flow between conduits 255 and 254 is interrupted.

Cylinder CF, which raises and lowers the carriage 67, is operated by valve VF. Valve VF has a movable valve member 260 with spaced spools 261, 262, and 263 carried thereon. Spool 263 has a shoulder 264. The valve member 260 is received in solenoid 265 at one end and solenoid 266 at the opposite end. The pressure line 141 is connected to the valve at port 267 while discharge line 172 is connected to the valve at ports 268 and 269. Cylinder CF has a piston 275 which is carried on a piston rod 276. Rod 276 is connected to link 83, which is connected to slide 67. The piston 275 divides the cylinder CF into chambers 277 and 278, the latter of which is connected to the valve VF at port 279.

The valve VF and the cylinder CF are connected in circuit with a deceleration valve 280. This valve has a movable member 281 carrying two spaced spools 282 and 283, the latter being tapered on the end facing the spool 282. The member 281 is urged to the left by a spring 284 interposed in the valve between the spool 282 and the end wall. The valve member is moved to the right against the spring action by contact with the cam 122b which is carried on the carriage bracket 122. Ports 293 and 297 of the deceleration valve 280 are connected by conduits 255 and 254 to compartment 241 of cylinder CE, while port 294 of that valve is connected to port 296 of valve VF.

When solenoid 266 of valve VF is energized, the valve member 260 is shifted to the left to the position shown in Fig. 10 and held there until moved by the energization of the opposite solenoid 265 by a spring urged detent 290 bearing against the shoulder 264. The detent holds the valve in position even after deenergization of solenoid 266. With the valve in the left hand position, pressure is supplied from conduit 141 to port 267, port 279, through conduit 291 to chamber 278 of cylinder CF. Discharge from chamber 277 occurs through conduit 292, conduit 255, port 293 of valve 280, port 294 of that valve, conduit 295, port 296 of valve VF, and port 269 to the discharge line 172. When the stop 240 is in the retracted position, a parallel discharge path around the tapered spool 283 is provided through conduit 255, passage 247, and conduit 254 into the valve 280. The stop pin 240 is extended when the carriage is in the lower position so that thereafter discharge through passage 247 is blocked and discharge from chamber 277 occurs exclusively through port 293. At this time, cam 122b is not in engagement with member 281, and the discharge flows freely through the deceleration valve 280. As the carriage approaches the intermediate position, cam 122b contacts member 281 of valve 280 and spool 283 restricts discharge through that valve to slow the carriage for its contact with stop pin 240. It should be noted that after the transfer of work pieces the stop pin is retracted by energization of solenoid 150e of valve VE, and passage 247 connects conduits 255 and 254 to permit discharge from chamber 277 therethrough to allow the carriage to move to the top position. When solenoid 265 is energized, the valve member 260 of valve VF is shifted to the right and held there by detent 290. Pressure is supplied from line 141 to port 267, port 296, conduit 295, port 294 of valve 280, and either conduit 254, passage 247 and conduit 255 to conduit 292, or directly from the valve 280 through port 293 to conduit 292 to the chamber 277 of cylinder CF. Discharge from the chamber 278 occurs through conduit 291, port 279, port 268, to discharge line 172.

In valves VA, VB, VC, VD, VE, VF, 280 and compartment 241 of cylinder CE, leakage past the spools is carried by a leakage line 176 to a conduit 177, leading to the reservoir 142.

Dashpot cylinder CG has a piston 300 dividing the cylinder into chambers 301 and 302. Although both chambers are connected to the discharge line 172, the slight back pressure therein will cause fluid to flow from chamber 301 to 302 through the check valve 304 when the piston is raised while fluid from chamber 302 will flow to chamber 301 through the throttle valve 305 when the piston is lowered. The piston 300 is connected to the rod 112 and the cylinder CG thus acts to check the rate of descent of the rotatable arm 91.

Figure 12:
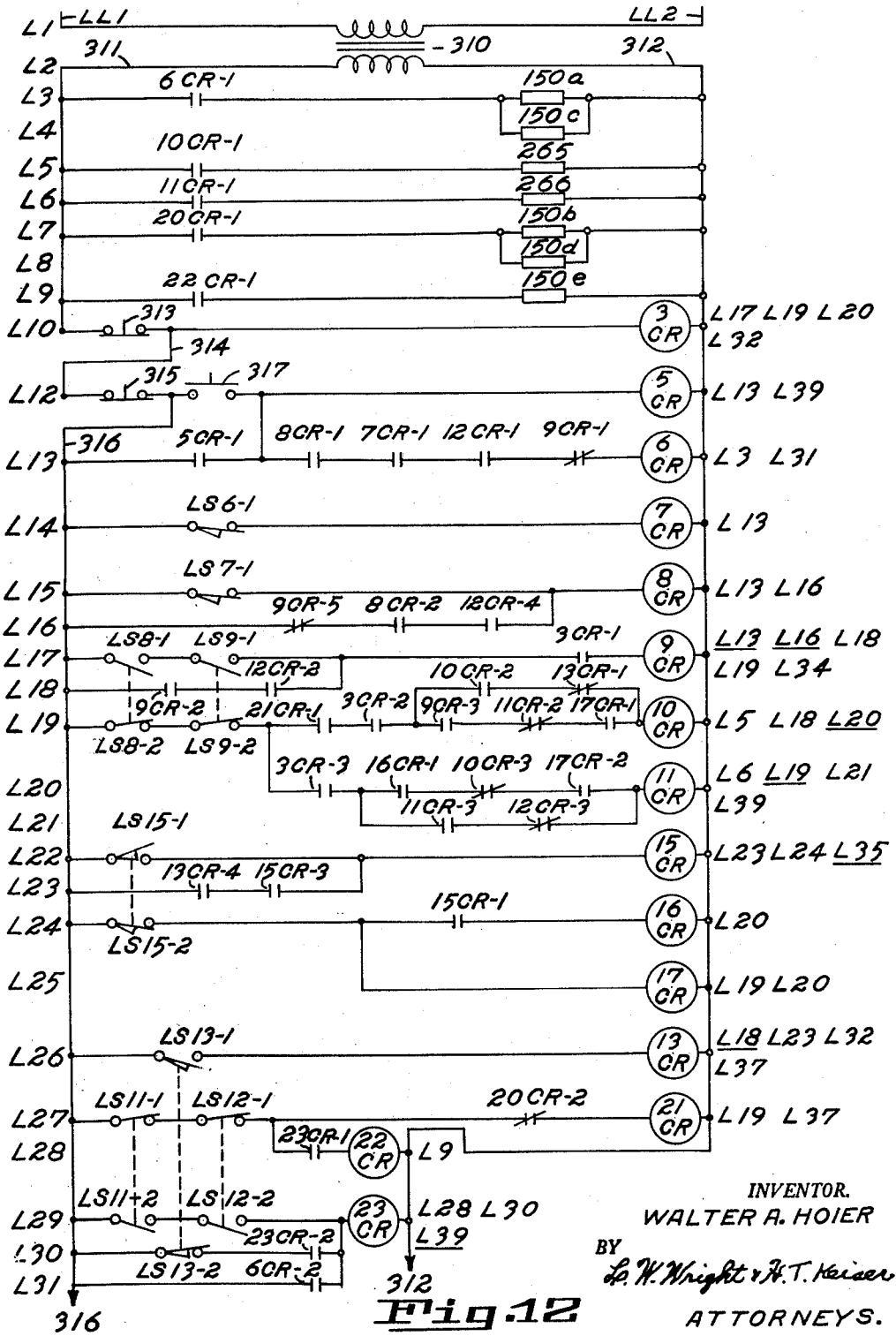

The electrical circuit of the work handling mechanism is shown in Figs. 12 and 13. In those figures the numbers prefixed by the letter L at the left of the diagram indicate the location of the part, and these reference numbers are given in parentheses in the description which follows. The numbers at the right of the diagram indicate the location of the relay switch contacts of the relay opposite said numbers, the underlined numbers indicating normally closed contacts. As shown in Fig. 2, limit switch LS5 is located on the top 77 of the carriage casing and is operated by a screw 309 (see Fig. 8) protruding from the top of the carriage bracket 122 when the carriage is in its top position. LS5 has normally open contact LS5–1 (L36) and normally closed contact LS5–2 (L37). LS13 is located on housing 61 and has normally open contact LS13–1 (L26) and normally closed contact LS13–2 (L30). LS13 is operated by a bolt 308 (see Fig. 2) depending from the carriage bracket 122 when the carriage is in the bottom position. Limit switches LS6 and LS7 have, respectively, normally open contacts LS6–1 (L14) and LS7–1 (L15). These switches are mounted on brackets 320 secured to the back plate 64 of casing 62 and are operated by lever arms 307 and 306 respectively. The lever arms 307 and 306 are pivotally carried in rear casing 93 (see Fig. 11) and extend through openings 321 (see Fig. 6) in that casing for contact at one end with the switches. The opposite ends of the arms 306 and 307 are moved by work pieces in the lower position and the position above the intermediate position, respectively, to operate the switches. Limit switches LS8, LS9, LS11, and LS12 have respectively contacts LS8–1 (L17) and LS8–2 (L19), LS9–1 (L17) and LS9–2 (L19), LS11–1 (L27) and LS11–2 (L29), and LS12–1 (L27) and LS12–2 (L29). These switches are operated, respectively, by cylinders CC, CA, CD, and CB (see Figs. 5 and 6). As shown in Fig. 2, LS10 is located on top of cylinder CE and is operated by the cam 122a connected to the carriage bracket 122. Switch LS10 has normally closed contact LS10–1 (L37) and normally open contact LS10–2 (L39). Limit switch LS15, which is connected to the base 21 of the machine for operation when the slide 37 is in the retracted position (see Fig. 1), has normally closed contact LS15–1 (L22) and normally open contact LS15–2 (L24).

When the carriage 67 is in the upper position before the cycle has begun, contacts LS5–1, LS6–1, LS7–1, LS8–2, LS9–2, LS10–2, LS11–1, LS12–1, LS13–2, and LS15–2 are closed.

A source of power is connected through lines LL1 and LL2 to the primary (L1) of transformer 310 while lines 311 and 312 are connected across the secondary (L2) thereof. A master switch 313 (L10) connects line 314 to line 311 and a relay 3CR (L10) is connected across lines 314 and 312 for energization when the switch 313 is closed. Relay 3CR has normally open contacts 3CR–1 (L17), 3CR–2 (L19), 3CR–3 (L20) and 3CR–4 (L32).

A switch 315 (L12) connects lines 314 and 316 and a push button start switch 317 (L12) is connected in series with relay 5CR (L12) across lines 312 and 316. Relay 5CR has normally open contacts 5CR–1 (L13) and 5CR–2 (L39).

With switch 315 closed, relay 7CR (L14), which is connected in series with LS6–1 across lines 316 and 312, and relay 8CR (L15) connected in series with LS7–1 across the same lines, are energized when pieces in the loading chute occupy the position above the intermediate position and the lower position, respectively. Relay 8CR is sealed in by series connected switch contacts 9CR–5, 8CR–2, and 12CR–4 connected across LS7–1. The relay 7CR has normally open contact 7CR–1 (L13) and the relay 8CR has normally open contacts 8CR–1 (L13) and 8CR–2 (L16). Relay 17CR (L25), which has normally open contacts 17CR–1 (L19) and 17CR–2 (L20), is connected in series with LS15–2 across lines 316 and 312 and is also energized at this time. Relay 12CR (L36), having normally open contacts 12CR–1 (L13), 12CR–4 (L16), 12CR–2 (L18), and normally closed contact 12CR–3 (L21), is connected across lines 316 and 312 in series with LS5–1 and is also energized at this time. Relay 21CR (L27) is energized through LS11–1 and LS12–1 and normally closed contact 20CR–2 from lines 316 and 312 and has normally open contacts 21CR–1 (L19) and 21CR–2 (L37).

When push button switch 317 is closed momentarily, relay 5CR is energized and remains energized after the release of switch 317 through its own contact 5CR–1 which is connected across that switch. Relay 6CR (L13), which is connected across lines 316 and 312 in series with contacts 8CR–1, 7CR–1, 12CR–1, and normally closed contact 9CR–1 and the parallel connected switch contact 5CR–1 and push button switch 317, is simultaneously energized and is also held energized through contact 5CR–1. Relay 6CR has normally open contacts 6CR–1 (L3) and 6CR–2 (L31). Relay 23CR (L29) is connected across lines 312 and 316 in series with 6CR–2 and is energized at this time. Relay 23CR is held energized through its own contact 23CR–2 and the series connected switch contact LS13–2 connected across 6CR–2. Relay 23CR also has normally closed contact 23CR–3 (L39) and normally open contact 23CR–1 (L28). Contact 23CR–1 is connected in series with LS11–1, LS12–1, and relay 22CR across lines 316 and 312 to energize that relay. Relay 22CR has normally open contacts 22CR–1 (L9) connected in series with solenoid 150e across lines 311 and 312 to energize that solenoid at this time and hold the valve VE in the right hand position and thereby hold the stop pin 240 in the retracted position.

The parallel connected solenoids 150a (L3) and 150c (L4) are connected in series with 6CR–1 across lines 311 and 312 and becomes energized when that contact closes. This holds valves VA and VC in the right hand position and operates cylinders CA and CC respectively. The operation of these two cylinders causes a transfer of an unground piece W1 from the loading chute to the holder H1 and the transfer of a partially ground piece W20 from the rotary member 91 to the holder H2. The operation of the cylinders CA and CC actuates, respectively, LS9 and LS8, opening contacts LS9–2 and LS8–2 and closing LS9–1 and LS8–1. This energizes relay 9CR (L17) which is connected in series with LS8–1, LS9–1, and 3CR–1 across lines 312 and 316. Relay 9CR is held energized through its own contact 9CR–2 (L18) and 12CR–2 which are connected in series across the switch contacts LS8–1 and LS9–1. 9CR also has a normally closed contact 9CR–1 (L13), a normally closed contact 9CR–5 (L16), and normally open contacts 9CR–3 (L19) and 9CR–4 (L34). The closing of contact 9CR–4 energizes relay 18CR (L34), which is connected in series with that contact across lines 316 and 312. Relay 18CR is sealed in through the normally closed contact 15CR–2 and 18CR–2 connected in series across the contact 9CR–4. Relay 18CR also has normally open contact 18CR–1 (L32).

When 9CR is energized, 6CR is deenergized and therefore solenoids 150a and 150c are released and valves VA and VC return to the position shown in Fig. 10 to retract the plungers of cylinders CA and CC. This again actuates limit switches LS9 and LS8 to again close LS8–2 and LS9–2. This energizes relay 10CR (L19) which is connected in series with LS8–2, LS9–2, 21CR–1, 3CR–2, 9CR–3, normally closed contact 11CR–2, and 17CR–1 across the lines 312 and 316. Relay 10CR is sealed in by its own contact 10CR–2 (L18) and normally closed contact 13CR–1 connected in series across the contacts 9CR–3, 11CR–2, and 17CR–1. Relay 10CR has, in addition, normally open contact 10CR–1 (L5), and normally closed contact 10CR3 (L20). Solenoid 265 (L5), which is connected in series with 10CR–1 across the lines 311 and 312, is energized to shift the valve VF to the right and operate the cylinder CF, moving the carriage downward.

As the carriage leaves the top position limit switch LS5 is released to open LS5–1 and close LS5–2. As the carriage 67 descends, limit switch LS10 is released, closing contact LS10–1 and opening contact LS10–2. This energizes relay 25CR (L37), which is connected in series across lines 312 and 316 with LS5–2, 13CR–3, LS10–1, and 21CR–2. The relay 25CR has normally open contacts 25CR–1 (L38) and 25CR–2 (L39). Contact 25CR–1 is connected across 13CR–3 and LS10–1 to hold the relay 25CR energized.

When the carriage 67 reaches the bottom position, the switch LS13 is operated to close contact LS13–1 and open contact LS13–2. This energizes the relay 13CR (L26), which is connected in series with LS13–1 across the lines 316 and 312. The relay 13CR has normally closed contacts 13CR–1 (L18) and normally open contacts 13CR–4 (L23), 13CR–2 (L32), and 13CR–3 (L37). At the same time relay 23CR is dropped out, to drop out relay 22CR and thereby deenergize solenoid 150e. This shifts valve VE to the left hand position to advance the stop 240.

The regulating wheel feed mechanism 50 is connected in series across lines 312 and 316 with relay 14CR, switch contact 13CR–2, contact 3CR–4, contact 18CR–1, and a timer relay contact 319 which is operable to break the circuit when the grinding operation is completed. Relay 14CR has contact 14CR–1 (L33) connected across contact 3CR–4 and 18CR–1. As the regulating wheel leaves the home, or retracted, position, as shown in Fig. 1, the switch LS15 is released, and contact LS15–1 closes while LS15–2 opens. This energizes relay 15CR (L22), which is connected in series with 15LS–1 across the lines 312 and 316. Relay 15CR has normally open contact 15CR–1 (L24), normally closed contact 15CR–2 (L35), and normally open contact 15CR–3 (L23).

When the regulating wheel returns to the home position, switch LS15 is again operated, and 16CR (L24), which is connected in series with LS15–2 and 15CR–1 across lines 312 and 316, is energized, relay 15CR being held energized through contacts 13CR–4 and 15CR–3 connected in series across the contact LS15–1. Relay 16CR has normally open contact 16CR–1 (L20) which is connected in series with LS8–2, LS9–2, 3CR–3, normally closed contact 10CR–3, 17CR–2, and relay 11CR across the lines 312 and 316 to energize that relay when the contact 16CR–1 is closed. Relay 11CR has normally open contact 11CR–1 (L6), normally closed contact 11CR–2 (L19), normally open contact 11CR–4 (L39) and normally open contact 11CR–3 (L21). This latter contact is connected in series with 12CR–3 across 16CR–1, 10CR–3, and 17CR–2 to hold in relay 11CR. The contact 11CR–1 is connected in series with solenoid 266 across lines 311 and 312 which is thereby energized when that contact is closed to shift the valve VF to the left and operate the cylinder CF and begin elevation of the carriage 67.

When the carriage 67 leaves the bottom position, LS13 is again released to open LS13–1 and close LS13–2. As the carriage 67 reaches the intermediate position, cam 122a operates limit switch LS10 to open LS10–1 and close LS10–2. This energizes relay 20CR (L39), which is connected in series with 10LS–2, 5CR–2, 11CR–4, 25CR–2, and the normally closed contact 23CR–3 across the lines 312 and 316. The relay 20CR has normally open contact 20CR–3 (L40) connected across 11CR–4 and 25CR–2. Relay 20CR also has normally open contact 20CR–1 (L7) and normally closed contact 20CR–2 (L27). The cam 122b on the carriage bracket 122 contacts member 281 of the deceleration valve to restrict the discharge passage from chamber 277 of cylinder CF. It will be noted that the extension of the stop pin blocks the other discharge passage from this chamber so that the rate of ascent of the carriage 67 is appreciably decreased prior to its contact with the stop pin 240.

At the intermediate position of the carriage 67 the parallel connected solenoids 150b and 150d, which are connected in series with 20CR–1 across lines 311 and 312, are energized to shift valves VB and VD to the right and operate, respectively, the cylinders CB and CD. This causes ejection of a finished piece W30 from the work holder H2 through the opening 111 in the rotary member 91 into the ejection chute 92 and causes a transfer of a partly finished piece W2 from the work piece holder H1 to the pocket 110 of the rotary member 91. The operation of cylinders CB and CD actuate the limit switches LS–11 and LS–12, opening LS11–1 and LS12–1 and closing LS11–2 and LS12–2. This again energizes relay 23CR, which is connected in series with the latter contacts across lines 312 and 316, and releases relay 20CR which deenergizes the solenoids 150b and 150d. Thus, the valve VB and VD return to the position shown in Fig. 10 and retract the plungers of cylinders CB and CD. This again actuates limit switches LS11 and LS12 to close LS11–1 and LS12–1, thereby energizing relays 21CR and 22CR. Energization of the relay 22CR energizes solenoid 150e, shifting the valve VE to the right and retracting the stop 240, thereby opening the discharge passage from chamber 277 through passage 247 of cylinder CF and permitting the carriage 67 to ascend to its top position.

Thus, as shown in Figs. 14a, 14b, and 14c, the work handling mechanism of the present invention is operable to handle two pieces simultaneously and to carry each piece successively from a loading chute 94 to a first work station S1, to index and carry the piece to a second work station S2, and to deposit the piece when finished in an ejection chute 92.

Fig. 14a shows the carriage 67 in its top, or loading, position with the bracket 122 engaging the collar 113 to hold the rotatable member 91 in its top position by means of the rod 112 to which the member 91 is operatively connected. When the member 91 is in its top position the pocket 110 therein lies on axis C and in path P2 of workholder H2. With the parts in this position the workholder H1 of the carriage lies on axis A while the aligned workholder H2 lies on axis C. At this time a raw, or unground work piece W1 is transferred from the loading chute 94, the lower end of which supports a work piece on axis A, to workholder H1 while a second piece W20, previously partially ground at station S1 and transferred to the rotatable member 91, is transferred from that member to workholder H2.

As shown in Fig. 14b the carriage 67 is moved to its lower, or operating, position, the bracket 122 engaging collar 114 to assure that the rotary member 91 is swung to its lower position. When in the lower position the pocket 110 lies on axis B in path P1 of workholder H1 and the opening 111 lies on axis D in path P2 of workholder H2. With the carriage in its operating position workholder H1, associated with station S1, with piece W1 is at station S1 and H2, associated with station S2, with piece W20 is at station S2 for the grinding of one pair of opposed trunnions on each piece.

The carriage is then raised to its intermediate position at the transfer station T with holders H1 and H2 lying on axes B and D respectively. Workpiece holder H1 is thus aligned with pocket 110 and workpiece holder H2 with opening 111, the rotary member being in the same position as shown in Fig. 14b. At this time the workpiece on holder H1, now partially ground and designated W2, is transferred to the pocket 110 while the workpiece on holder H2, now completely ground and designated W30, is transferred from holder H2 through opening 111 to the ejection chute 92.

The carriage is now elevated to the position shown in Fig. 14a. The engagement of bracket 122 with collar 113 raises the member 91 to the position shown in that figure, simultaneously indexing the workpiece carried in the pocket ninety degrees so that when this piece is transferred to holder H2 the unground pair of trunnions will be carried by the fingers of the workpiece holder.

It will be noted, as shown in Fig. 15, that the axis of rotation A of the rotary member 91, the point B where a piece is transferred to the rotary member 91, and the point C where the workpiece is transferred from the rotary member, define a triangle, the sides AB and AC of which are equal and the apex angle at A being equal to the angle through which it was desired to index the piece between work stations. In the embodiment illustrated the axis A was located on the path of one of the workholders and the distance from the axis to the pocket (AB and AC) was equal to the distance between the parallel paths P1 and P2. Thus the apex angle at A was equal to ninety degrees.

As shown by the triangle A1, B1, C1, a ninety degree indexing can be obtained without locating the axis A1 of rotation on one of the paths, if the distance from the axis of rotation to the pocket (A1—B1 and A1—C1) is made less than the distance between the paths. Also, as shown in triangles A2, B2, and C2 it may be desirable to index a piece less than 90°. This can be accomplished by making the distance from the axis of rotation to the pocket (A2—B2 and A2—C2) greater than the distance between the paths P1 and P2 with the apex angle A2 being equal to the desired angle of indexing rotation of the part between work stations.

What is claimed is:

1. In a centerless grinding machine having two spaced work stations in a common horizontal plane, a workpiece handling mechanism operable to handle two workpieces simultaneously and index each workpiece as it moves from one station to the other, said mechanism comprising: a transfer station above the work stations having a loading chute adapted to release workpieces one at a time, an ejection chute, and a member having a pocket and swingable about an axis to move the pocket between a first position in the same horizontal plane as the loading chute and a second position in the same horizontal plane as the ejection chute; a carriage having two workpiece holders in a common horizontal plane, each holder having fingers adapted to carry a workpiece, the carriage being vertically movable between a loading position where the fingers of one workpiece holder are adjacent the loading chute and the fingers of the other workpiece holder are adjacent the first position in the transfer station and an operating position where the fingers of the workpiece holders are at the respective work stations; means to hold the pocket of the swingable member in the first position when the carriage is in the loading position; plungers operable to move a workpiece from the loading chute to the fingers of said one workpiece holder and to move a workpiece from the pocket of the swingable member to the fingers of the other workpiece holder when the carriage is in the loading position; means to lower the carriage to the work stations for the simultaneous grinding of the workpieces carried thereby; means to swing the member to move the pocket to the second position; means to raise the carriage after grinding to an intermediate position where the fingers of the one workpiece holder are adjacent the second position and the fingers of the other workpiece holder are adjacent the ejection chute in the transfer station; plungers operable to move a workpiece from the fingers of said one workpiece holder to the pocket and to move a workpiece from the fingers of the other workpiece holder to the ejection chute; means to raise the carriage to the loading position; and means to swing the member and move the pocket thereof to the first position.

2. In a machine tool having at least two work stations, a workpiece handling mechanism operable to handle two workpieces simultaneously and index each workpiece as it moves said workpiece from one of said stations to the other, the workpiece handling mechanism comprising: a loading chute, an ejection chute, and a member having a pocket and swingable about an axis to move the pocket between a first position and a second position at a transfer station; a carriage having two workpiece holders and movable between the work stations and a loading position where one of said workpiece holders is adjacent the loading chute and the other of said holders is adjacent said first position in the transfer station; means responsive to the movement of the carriage to swing the member and move the pocket to the first position when the carriage is in the loading position; hydraulically powered plungers operable when the carriage is in the loading position to simultaneously transfer a workpiece from the loading chute to said one workpiece holder and transfer a second workpiece from said pocket to said other workpiece holder; hydraulically powered means to move the carriage to the work stations for grinding of the workpieces; a retractable positive stop operable when extended to stop the carriage at an intermediate position in the transfer station with the one of said workpiece holders adjacent the second position and the other of said workpiece holders adjacent the ejection chute; means to extend said stop and move the carriage to the intermediate position; means responsive to the movement of the carriage to swing the pocket of the member to the second position; hydraulically powered plungers operable when the carriage is in the intermediate position to simultaneously transfer a workpiece from said one workpiece holder to said pocket and to transfer a workpiece from the other workpiece holder into said ejection chute; and hydraulically powered means to move the carriage to the loading position.

3. In a centerless grinding machine having two work stations each having a wheel automatically movable into and out of grinding position for a grinding operation, a workpiece handling mechanism operable to move a workpiece from one work station to the other work station and simultaneously index the same, said mechanism comprising: a transfer station having a loading chute, an ejection chute, and a member having a pocket and swingable about an axis to move the pocket between a first position and a second position; a carriage having two workpiece holders and movable between an operating position where the workpiece holders are adjacent the work stations, and a loading position where one of said workpiece holders is adjacent the loading chute and the other of said holders is adjacent said first position in the transfer station; means to hold the pocket in the first position when the carriage is in the loading position; hydraulically actuated plungers operable when actuated to simultaneously transfer a workpiece from the loading chute to said one workpiece holder and transfer a second workpiece from said pocket to said other workpiece holder; electrical means automatically to actuate said plungers in response to the movement of the carriage into the loading position; hydraulically powered means automatically to move the carriage to the work stations in response to completion of said transfer; electrical means automatically to initiate movement of said wheel into grinding position in response to movement of the carriage into the operating position; hydraulically powered means responsive to completion of the grinding operation automatically to move the carriage to an intermediate position in the transfer station with the one of said workpiece holders adjacent the second position and the other of said workpiece holders adjacent the ejection chute; means responsive to the movement of the carriage to swing the pocket of the member to the second position; hydraulically powered plungers operable when actuated simultaneously to transfer a workpiece from said one workpiece holder to said pocket and to transfer a workpiece from the other workpiece holder into said ejection chute; electrical means automatically to actuate said plungers in response to movement of the carriage into the intermediate position; hydraulically powered means automatically to move the carriage to the loading position in response to completion of said transfer, and means responsive to the movement of the carriage to the loading position to swing the pocket of the member to the first position.

4. In a machine tool having at least two work stations, a workpiece handling mechanism operable to index a workpiece having two surfaces to be machined lying in a common plane and spaced a predetermined angle from each other, the mechanism comprising: means to move a workpiece to the first work station for machining of one of the surfaces thereon; means to move the workpiece away from the first work station to a first position; a member swingable to said first position about an axis and having means to receive and hold a workpiece with the surfaces to be machined lying in a plane normal to the axis of the member; means to transfer a workpiece to said member at said first position; means to swing said member from said first position through said predetermined angle to a second position and thereby index the workpiece; and means to move the workpiece from said second position to the second work station for machining of the other surface thereon.

5. A work handling and indexing mechanism operable to move a workpiece between two stations of a machine tool for successive operations on different surfaces oriented a predetermined angular amount from each other comprising: means defining a fixed support above the work stations; a member having means to receive and hold a workpiece therein pivotally connected to said support at a point spaced from said workpiece receiving means, said member being swingable to swing the workpiece receiving means thereof between a first position and a second position angularly spaced said predetermined amount from said first position; means to move a workpiece from one of said work stations to said first position; means to transfer a workpiece to said member at said first position; means to swing said member to swing the workpiece receiving means thereof to said second position; means to transfer a workpiece from said member at said second position; and means to move a workpiece from said second position to said other work station.

6. A work handling mechanism operable to move and index a workpiece between two stations of a machine tool comprising: a fixed support extending upwardly from said work stations; means defining ways on said support; a pair of workpiece holders movable on said ways along parallel paths extending from the respective work stations; a member having means to receive and hold a workpiece therein pivotally connected to said support at a point spaced from said workpiece receiving means, said member being swingable to swing the workpiece receiving means thereof between a first position in registration with one of said parallel paths and a second position in registration with the other of said parallel paths; means at the first position to transfer a workpiece from the workpiece holder moving in said one path to the swingable member; and means at the second position to transfer a workpiece from the swingable member to the workpiece holder moving in said other path.

7. A work handling and indexing mechanism operable to move a workpiece through two stations of a machine tool for successive operations thereon and index said workpiece between stations comprising: a carriage having means thereon to receive two workpieces in spaced relation; ways extending above the work stations to slidably receive the carriage and guide workpieces received thereby towards and away from the respective stations in parallel paths; a transfer station above the work stations and adjacent the ways including a fixed support, a shaft pivotally mounted in said support, a member carried on the shaft and having means spaced from said shaft to receive and hold a workpiece fixed relative to said member; means to rotate said shaft and swing a workpiece received in said member between a first position in registration with one of said parallel paths to a second position in registration with the other of said paths; means to transfer a workpiece from the carriage to said member at the first position; means to transfer a workpiece from the member to the carriage at the second position; and means to move the carriage along said ways between the work stations and the transfer station.

8. A work handling and indexing mechanism operable to move simultaneously two workpieces through two successive work stations of a machine tool for successive elongated casing mounted on the machine tool and extending vertically over said work stations, a pair of workpiece holders slidably received in the casing for movement in predetermined paths towards and away from the respective work stations, a member pivotally connected to the casing and having means to receive and hold a workpiece, said member being swingable between a first position with the workpiece receiving means thereof in registration with the path of one of said workpiece holders and a second position with the workpiece receiving means thereof in registration with the path of the other of said workpiece holders, means to transfer an unoperated workpiece to said one workpiece holder, means to transfer a workpiece from said swingable member to said other workpiece holder at the second position, means to move said one workpiece holder to one of said work stations and to move the other workpiece holder to the other work station, means to swing said swingable member to the first position, means to move said workpiece holders away from said respective work stations, means to transfer a workpiece from the one workpiece holder to the swingable member at the first position, means to eject a workpiece from the other workpiece holder, and means to swing the swingable member to the second position.

9. A work handling and indexing mechanism operable to move simultaneously two workpieces through two successive work stations of a machine tool for successive operation on different axes of the workpieces comprising an elongated casing mounted on the machine tool and extending vertically over said work stations, a carriage received in said casing and movable vertically therein between the work stations and an upper position, said carriage having fingers depending therefrom associated with the respective work stations to carry two workpieces spaced in correspondence with said work stations towards and away from said respective stations, a member pivotally connected to the casing and having a pocket adapted to receive and carry a workpiece, said member being swingable between a first position with the pocket thereof in registration with the fingers associated with one of said work stations when the carriage is in an intermediate position and a second position with the pocket thereof in registration with the fingers associated with the other of said work stations when the carriage is in its upper position, means to transfer an unoperated workpiece to the fingers associated with said one work station and to transfer a workpiece from the pocket to the fingers associated with said other work station when the carriage is in its upper position and the pivotal member is in its second position, means to lower the carriage to the work stations, means to swing the pivotal member to its first position, means to raise the carriage to its intermediate position, means to transfer a workpiece from the fingers associated with said one station to the pocket and eject a workpiece from the fingers associated with said other station when the carriage is in the intermediate position and the pivotal member is in its first position, means to raise the carriage to its upper position, and means to swing the pivotal member to its second position.

10. A work handling and indexing mechanism operable to move simultaneously two workpieces through two successive work stations for successive operations on surfaces 90 degrees apart comprising an elongated casing mounted on the machine tool and extending vertically over said work stations, a loading chute connected to the casing and having an opening above one of said work stations, a carriage received in said casing having fingers depending therefrom defining two workpiece holders associated with the respective work stations and spaced in correspondence with said work stations, said carriage being movable in the casing to carry workpieces thereon towards and away from the respective stations in parallel paths, a shaft rotatably received in the casing in registration with the opening in the loading chute and the path of the workpiece holder associated with said one of the work stations, a member carried by the shaft having a workpiece receiving pocket spaced from the shaft an amount equal to the distance between said parallel paths, said pocket being swingable on rotation of the shaft between a first position below the opening in the loading chute in the same vertical plane therewith and in registration with the path of the workpiece holder associated with said one work station and a second position spaced 90 degrees therefrom in registration with the path of the workpiece holder associated with the other work station and in the same horizontal plane with the opening in the loading chute, means to move the carriage from an operating position where the workpiece holders are at their respective work stations to an intermediate position where the workpiece holder associated with said one work station is in registration with the pocket of the swingable member in the first position, means to transfer a workpiece from the holder associated with said one work station to the pocket of the swingable member and means to eject a workpiece from the holder associated with said other work station when the swingable member is in the first position and the carriage is in the intermediate position, means to raise the carriage from the intermediate position to an upper position where the holder associated with said one work station is in registration with the opening in the loading chute and the holder associated with said other work station is in registration with the second position of the pocket, means including a pinion on the shaft and a rack operated by elevation of the carriage from its intermediate position to its upper position to rotate the shaft and swing the pocket to its second position, means to transfer a workpiece from the pocket to the holder associated with the other work station and means to transfer a workpiece from the loading chute through the opening thereof to the holder associated with said one work station when the swingable member is in the second position and the carriage is in the upper position, and means to lower the carriage to the operating position.

References Cited in the file of this patent

UNITED STATES PATENTS 2,809,471     Jones et al. _____ Oct. 15, 1957

UNITED STATES PATENT OFFICE

CERTIFICATE OF CORRECTION

Patent No. 2,914,890 December 1, 1959

Walter A. Hoier

It is hereby certified that error appears in the printed specification of the above numbered patent requiring correction and that the said Letters Patent should read as corrected below.

Column 16, line 40, after "successive" insert -- operations on different surfaces thereof comprising an --.

Signed and sealed this 17th day of May 1960.

(SEAL)
Attest:

KARL H. AXLINE
Attesting Officer

ROBERT C. WATSON
Commissioner of Patents